(12) United States Patent
Beyfuss et al.

(10) Patent No.: US 6,408,519 B1
(45) Date of Patent: Jun. 25, 2002

(54) METHOD FOR SECURING A BEARING IN A BEARING PLATE AND BEARING ARRANGEMENT

(75) Inventors: Berthold Beyfuss, Kaisten; Manfred Brandenstein, Eussenheim; Burkhard Buchheim, Schweinfurt; Helmut Hauck, Euerbach; Peter Horling, Mainberg, all of (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/624,912

(22) Filed: Jul. 24, 2000

(30) Foreign Application Priority Data

Jul. 28, 1999 (DE) .......................................... 199 35 469

(51) Int. Cl.$^7$ .............................................. B21D 53/10
(52) U.S. Cl. ...................................... 29/898.07; 29/521
(58) Field of Search ........................ 29/898.07, 898.061, 29/898.062, 898.064, 898, 509, 521, 525; 384/537, 561, 584, 585, 903

(56) References Cited

U.S. PATENT DOCUMENTS

| | | | |
|---|---|---|---|
| 3,148,437 A | * 9/1964 | Busch | 29/898.061 |
| 3,639,016 A | * 2/1972 | Bourgeois | 384/482 |
| 3,692,372 A | 9/1972 | Pineo | |
| 4,083,613 A | * 4/1978 | McGee | 384/585 |
| 4,549,823 A | * 10/1985 | Nichting | 384/537 |
| 4,672,810 A | * 6/1987 | Marlowe | 60/332 |
| 4,688,952 A | * 8/1987 | Setele | 384/537 |
| 5,067,827 A | * 11/1991 | Bokel | 384/537 |
| 5,099,559 A | * 3/1992 | McGrath | 492/16 |
| 5,165,169 A | * 11/1992 | Boyce | 29/898.08 |
| 5,259,677 A | * 11/1993 | Degrange et al. | 384/585 |
| 5,564,838 A | 10/1996 | Caillault et al. | |
| 5,681,118 A | * 10/1997 | Armstrong et al. | 384/513 |
| 5,707,157 A | * 1/1998 | Pritchard et al. | 384/542 |
| 6,106,155 A | * 8/2000 | Beyfuss et al. | 384/537 |
| 6,279,231 B1 | * 8/2001 | Beyfuss et al. | 29/898.07 |
| 6,349,470 B1 | * 2/2002 | Sasaki et al. | 29/898.62 |

FOREIGN PATENT DOCUMENTS

| | | |
|---|---|---|
| DE | 298 09 031 U1 | 11/1998 |
| DE | 19805237 | 8/1999 |
| EP | 0 029 395 A2 | 5/1981 |
| EP | 0 485 001 A2 | 5/1992 |
| EP | 0 891 031 A1 | 1/1999 |
| FR | 2 592 108 A1 | 6/1987 |

* cited by examiner

Primary Examiner—S. Thomas Hughes
Assistant Examiner—Essama Omgba
(74) Attorney, Agent, or Firm—Burns, Doane, Swecker & Mathis, L.L.P.

(57) ABSTRACT

A method for securing at least one bearing in a bearing plate provided with an indentation or recessed region for receiving a bearing involves partially swaging at least one positioning face on the bearing plate for accurately or precisely positioning a retaining baffle, positioning the retaining baffle against the at least one swaged positioning face, and materially bonding the retaining baffle to the bearing plate so that the retaining baffle exerts an axial force on a part of the bearing during operation of the bearing. A bearing arrangement includes a bearing plate provided with at least one indentation and at least one partially swaged positioning face, a bearing disposed in the at least one indentation, and a retaining baffle pressed against the positioning face of the bearing plate. The retaining baffle is materially bonded to the bearing plate and is positioned such that the retaining baffle exerts an axial force on a part of the bearing during operation of the bearing.

10 Claims, 2 Drawing Sheets

METHOD FOR SECURING A BEARING IN A BEARING PLATE AND BEARING ARRANGEMENT

Figure 1:
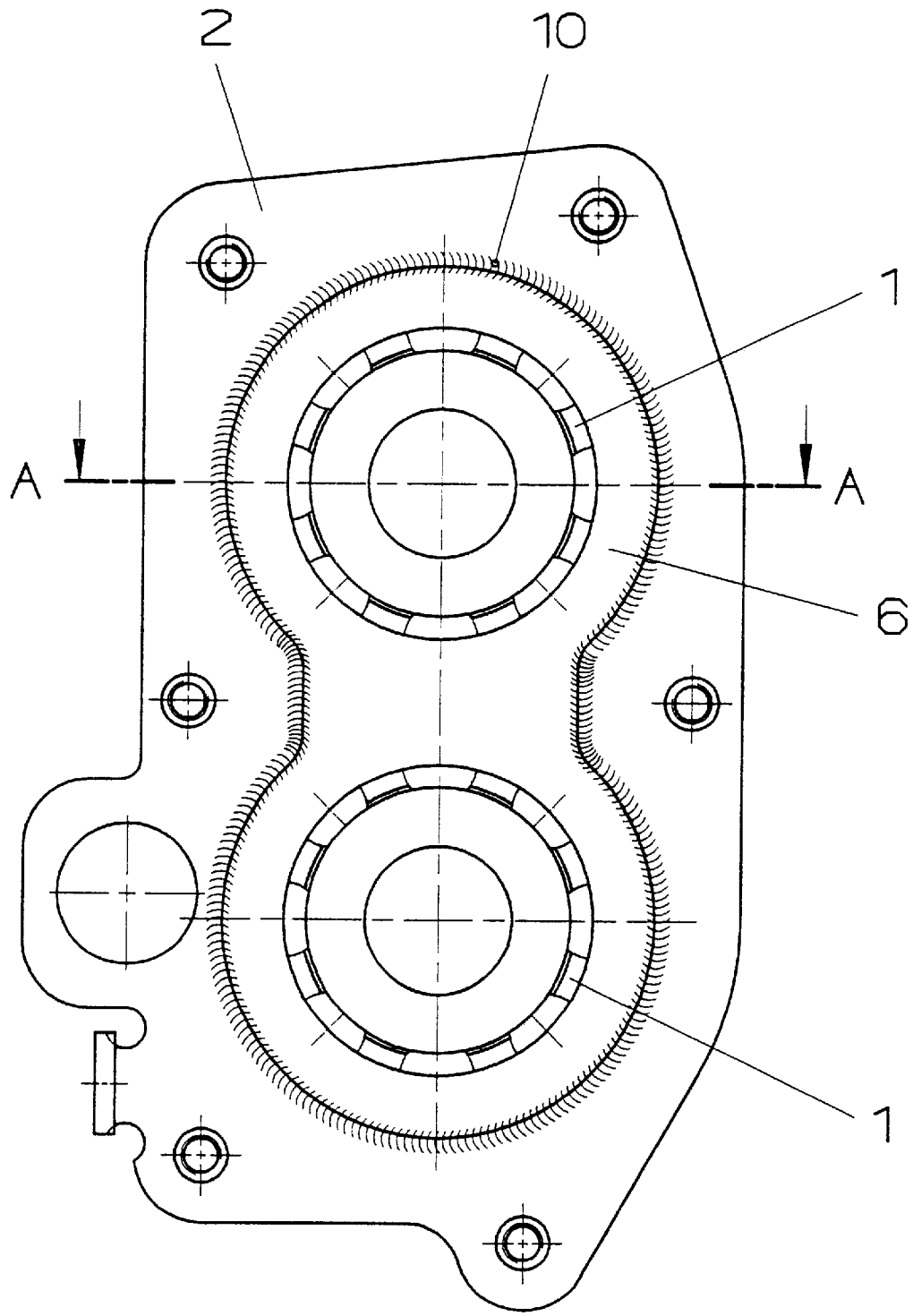

This application is based on and claims priority under 35 U.S.C. §119 with respect to German Application No. P 199 35 469.3, the entire content of which is incorporated herein by reference.

FIELD OF THE INVENTION

The present invention generally relates to bearing plates and bearing arrangements. More particularly, the present invention pertains to a bearing arrangement that includes a bearing plate having at least one indentation in which is disposed a bearing, and a method for securing at least one bearing in a bearing plate.

BACKGROUND OF THE INVENTION

A bearing arrangement and a method for securing a bearing in a bearing plate are known from German Patent Disclosure DE 198 05 237. This document describes introducing bearings into a bearing receptacle that is created by deep drawing a sheet-metal base to form indentations. Radial fixation of the bearing is achieved by way of such indentations.

If, for example, two parallel-extending shafts in a transmission must have quite a tight spacing from one another, it may be necessary for the respective shaft bearings to be brought close enough together that a figure eight contour is formed in the bearing plate carrying the bearing. At least part of the reason is because there is no longer enough room for the outer rings of the various bearings to be completely surrounded.

In the previously known bearing arrangement, the two bearings which must be disposed quite close together are inserted into the deep-drawn seat faces in the bearing plate. To then axially fix the bearings in the bearing plate, the bearing plate is plastically deformed in the context of a caulking operation so that axial motion of the bearings is inhibited. Under especially heavy loads in operation, however, the outer bearing rings can come loose from their seat faces in the bearing plate. This is due at least in part to the squeezing that occurs during operation and is propagated from the shafts to the bearings. This can gradually lead to loosening of the axial fixation of the outer bearing rings.

In principle, other possibilities are conceivable for attaining an axial fixation of the bearings in a bearing plate. This can be done by welding or soldering, for instance. However, it has been experimentally found that in order to produce the required degree of durability and precision of the bearing fixation on the one hand and to make the method economical on the other hand, the difficult problem of burr migration has to be addressed.

In light of the foregoing, a need exists for a method and a bearing arrangement that make possible the reliable axial fixation of the bearings in a bearing plate, without a significant degree of effort, and hence expense.

SUMMARY OF THE INVENTION

According to one aspect of the present invention, a method for securing at least one bearing in a bearing plate involves at least partially swaging at least one positioning face on the bearing plate for precisely positioning a retaining baffle. The retaining baffle is then placed against the swaged positioning face in a position such that in later operation of the bearing, the retaining baffle exerts an axial force on a part of the bearing. The retaining baffle is then preferably material bonded to the bearing plate.

It has been found that the present invention provides a very good compromise between production costs on the one hand and precision and durability of the bearing arrangement on the other. By using a swaging operation that is preferably carried out together with the deep drawing of the indentations of the bearing plate, a defined contact face for the retaining baffle is created. Thus, relatively high precision for the fixation of the bearing is attainable. Because of the swaged positioning face, the retaining baffle can be placed and held in a very simple way while being fixed to the bearing plate by material bonding. Preferably, the positioning of the retaining baffle for the sake of exerting an axial force on a part of the bearing in later operation of the bearing is effected such that the retaining baffle is subjected to a predetermined force F during the fixation of the retaining baffle to the bearing plate in the axial direction of the bearing. The retaining baffle is thus fixed in a prestressed fashion, and therefore extremely long durability and excellent fixation of the bearing in the bearing plate can be attained.

It is preferable that before positioning the retaining baffle and material bonding the retaining baffle to the bearing plate, the bearing is also axially fixed relative to the bearing plate by plastic deformation, preferably by caulking a subregion of the bearing plate. The axial fixation of the bearing can be further improved by proceeding in this way.

It is also preferable that the material bonding be carried out by welding, for example through use of a laser welding method or an electron-beam welding method. As an alternative, the material bonding can be accomplished indirectly via an additional material introduced into a gap between the bearing plate and the retaining baffle, with the material bonding being performed by soldering or adhesive bonding.

The bearing arrangement in accordance with another aspect of the present invention includes a bearing plate and a retaining baffle, with the bearing plate having at least one partially swaged positioning face for relatively precisely positioning the retaining baffle. The retaining baffle is pressed against the positioning face and is materially bonded to the bearing plate. The retaining baffle is positioned such that in later operation of the bearing the retaining baffle exerts an axial force on a part of the bearing.

According to a preferred form of the invention, the bearing is positively joined to the bearing plate by plastic deformation, preferably by caulking, of a subregion of the bearing plate in the axial direction. The material bond between the retaining baffle and the bearing plate is preferably accomplished by welding, preferably laser welding or electron-beam welding. Alternatively, the retaining baffle can also be soldered or adhesively bonded to the bearing plate. The retaining baffle is also preferably formed in such a way that its underside presses on a part of the side region of the outer ring of the bearing.

In accordance with another aspect of the invention, a bearing arrangement includes a bearing plate provided with at least one recessed region in which is positioned a bearing, with the bearing plate being provided with a positioning face surrounding at least a portion of the recessed region, and a retaining baffle fixed to the bearing plate in overlying relation to the bearing.

BRIEF DESCRIPTION OF THE DRAWING FIGURES

Figure 2:
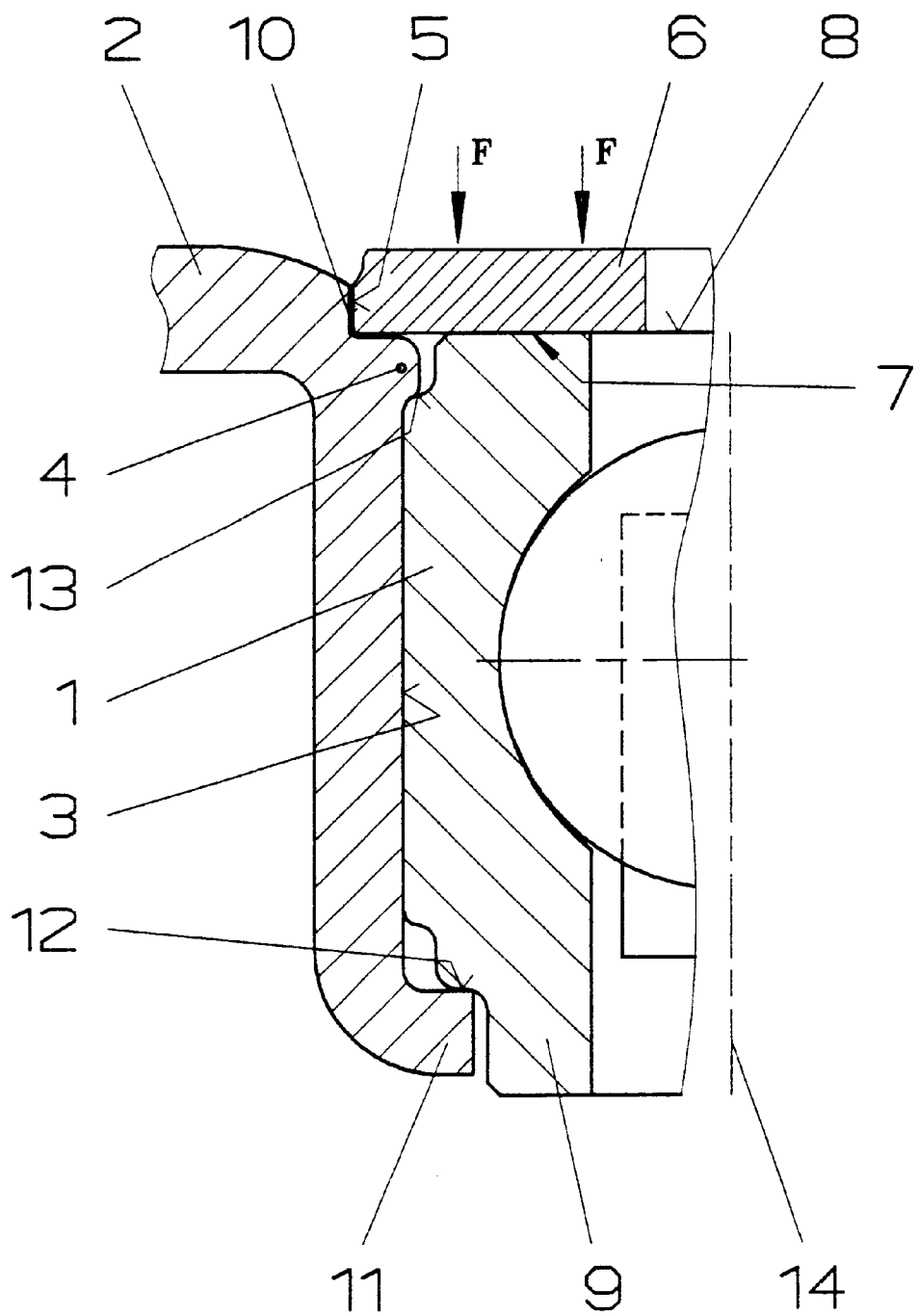

The foregoing and additional features and characteristics of the present invention will become more apparent from the following detailed description considered with reference to the accompanying drawing figures in which like elements are designated by like reference numerals and wherein:

FIG. 1 is a plan view of a bearing plate according to the present invention carrying two bearings; and FIG. 2 is an enlarged cross-sectional view of the bearing plate taken along the section line II—II in FIG. 1.

DETAILED DESCRIPTION OF THE INVENTION

FIG. 1 illustrates a bearing plate 2 according to the present invention in which are disposed two roller bearings 1. The two bearings 1 must have a relatively tight or close spacing with respect to one another and so the indentation or recessed region in the bearing plate 2 that receives the bearings 1 possesses a figure eight form. For axial fixation of the bearings 1 with respect to the bearing plate 2, a retaining baffle 6 is welded onto the top of the bearing plate 2. This retaining baffle 6 also takes the form of a figure eight or a "pair of glasses".

Further details associated with the present invention are shown in FIG. 2. The bearing plate 2 includes the indentation or recessed region 3 that receives the outer ring 9 of the bearing 1. This indentation of recessed region 3 is preferably formed in an economical manner through use of a deep drawing operation. To axially fix the outer ring 9 of each bearing toward the bottom of the bearing plate 2 (i.e., toward the bottom part of the recessed region 3), the bearing plate 2 is provided with a radially inwardly extending axial end stop 11. Each outer ring 9 possesses a lower bearing shoulder 12 that presses against the axial end stop 11, thus axially fixing the bearing relative towards the lower portion of the recessed region 3 of the bearing plate 2.

For axial fixation of each outer ring 9 in the upper region of the bearing plate 2, a region or portion 4 of the bearing plate 2 is plastically deformed in a radially inward direction as seen in FIG. 2. The region 4 of the bearing plate 2 that is plastically deformed is located near the upper portion of the recessed portion 3 of the bearing plate. The bearing outer ring 9 possesses an upper bearing shoulder 13. As can be seen clearly in FIG. 2, the region 4 is caulked in such a way (i.e., plastically deformed) that it presses against the upper bearing shoulder 13 of the outer ring 9 and thus assures an axial fixation of the bearing.

For especially heavy loads, it is oftentimes not sufficient to make do solely with the subregion 4 of plastic deformation for axially fixing the bearing. Thus, according to the present invention, a positioning face 5 is swaged or at least partially swaged into the bearing plate 2 so that the positioning face surrounds at least a portion of the recessed region. The fabrication of the positioning face 5 can be accomplished simultaneously with the creation of the indentation or recessed region 3 by deep drawing. Alternatively, the positioning face 5 can be produced during the plastic deformation operation (i.e., caulking operation) for producing the region 4 that serves as an upper axial limit for the bearing.

The positioning face 5 is formed in such a way, for instance with a tolerance of a few tenths of a millimeter, that a retaining baffle 6 having adequate precision in terms of its shape can be placed or seated in the positioning face 5. Thus, the positioning face 5 not only has a stop in the radial direction of the bearing but also has a stop in the axial direction. The axial definition of the positioning face 5 is provided such that the retaining baffle 6, upon contact with the positioning face 5, exerts an axial force on the bearing ring 9. For this reason, the axial stop of the positioning face 5 is recessed somewhat compared to the side region 8 of the outer ring 9 of the bearing 1, for instance by a few hundredths of a millimeter. Thus, the axial stop or axially limiting surface of the positioning face 5 lies in a plane located slightly below the side region 8 of the outer ring 9 of the bearing.

After positioning the retaining baffle 6 in the positioning face 5 of the bearing plate 2, the retaining baffle 6 is welded to the bearing plate 2 to thereby form the weld seam 10. It should be noted in this respect that the positioning face 5 is designed so that a welding gap of typical size, depending on the welding process, is left in the radial direction between the outer circumference of the retaining baffle and the radial stop surface of the positioning face 5 for the aforementioned welding that is carried out to fix the retaining baffle 6 in place on the bearing plate 2. The welding can be laser welding or electron-beam welding.

During the welding operation, the retaining baffle 6 is preferably loaded from above, namely in the direction of the force F, so that after the weld seam 10 has been made, the underside 7 of the retaining baffle 6 presses against the side region 8 of the outer ring 9 of the bearing 1. This thus helps ensure a solid prestressing or retention of the bearing in the bearing plate. As a result, even over long-term use, the bearing is relatively perfectly fixed in the bearing plate 2.

As an alternative to welding the retaining baffle 6 to the bearing plate 2, the fixation of the retaining baffle to the bearing plate can be achieved indirectly by an additional material introduced into the gap between the retaining baffle and the bearing plate. Thus, the fixation of the retaining baffle to the bearing plate can be accomplished by soldering or adhesive bonding. Thus, the weld seam 10 shown in FIG. 2 is intended to represent these other alternative forms of fixation.

The method and bearing arrangement of the present invention offer an improved way of securing a bearing in a bearing plate. Utilizing a swaging operation to produce the positioning face, preferably a swaging operation that is carried out together with the deep drawing of the recessed portions of the bearing plate, it is possible to produce a defined contact face for the retaining baffle. Thus, relatively high precision for fixing the bearing is achieved. The positioning face allows the retaining baffle to be placed and held in a very simple yet relatively precise manner while being fixed to the bearing plate in an appropriate manner The present invention also provides an economical way of fixing the bearing in the bearing plate while also ensuring a reliable fixation of the bearing relative to the bearing plate even over long-term use of the bearing.

The principles, preferred embodiment and mode of manufacture of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention.

What is claimed is:

1. A method for securing at least one bearing in a bearing plate which possesses an indentation for receiving the bearing, comprising:

at least partially swaging at least one positioning face on the bearing plate;

positioning a bearing in the indentation before or after the partial swaging of the at least one positioning face;

positioning a retaining baffle against the at least one positioning face to cover the bearing;

material bonding the retaining baffle to the bearing plate so that during operation of the bearing the retaining baffle applies an axial force on a part of the bearing.

2. The method of claim 1, including axially fixing the bearing relative to the bearing plate by plastic deformation of a subregion of the bearing plate, said axial fixation of the bearing relative to the bearing plate being performed before positioning the retaining baffle against the at least one positioning face and before material bonding the retaining baffle to the bearing plate.

3. The method of claim 2, wherein the bearing is axially fixed relative to the bearing plate by caulking.

4. The method of claim 3, wherein the material bonding of the retaining baffle to the bearing plate is performed by welding.

5. The method of claim 4, wherein the welding is laser welding or electron-beam welding.

6. The method of claim 1, wherein the material bonding of the retaining baffle to the bearing plate is performed by welding.

7. The method of claim 6, wherein the welding is laser welding or electron-beam welding.

8. The method of claim 1, wherein the material bonding is accomplished indirectly by introducing an additional material into a gap between the bearing plate and the retaining baffle.

9. The method of claim 1, wherein the material bonding is accomplished by soldering or adhesive bonding.

10. The method of claim 1, wherein an axial force is applied to the retaining baffle during material bonding of the retaining baffle to the bearing plate to exert the axial force on a part of the bearing during operation of the bearing.

* * * * *